United States Patent [19]

Himeno et al.

[11] Patent Number: 4,882,977
[45] Date of Patent: Nov. 28, 1989

[54] ROTARY ACTUATOR

[75] Inventors: Toshio Himeno, Ashiya; Hitoshi Shimizu, Takarazuka; Satoshi Shinkai, Nishinomiya, all of Japan

[73] Assignee: Konan Electric Co., Ltd., Nishinomiya, Japan

[21] Appl. No.: 236,323

[22] Filed: Aug. 24, 1988

Related U.S. Application Data

[63] Continuation of Ser. No. 841,394, Mar. 19, 1986, abandoned.

[30] Foreign Application Priority Data

Mar. 23, 1985 [JP] Japan ................. 60-057553
Mar. 23, 1985 [JP] Japan ................. 60-057554
Dec. 13, 1985 [JP] Japan ................. 60-191010
Mar. 13, 1986 [JP] Japan ................. 61-053753

[51] Int. Cl.$^4$ .................... F01B 31/12; F01B 9/04
[52] U.S. Cl. ........................ 92/5 R; 92/138; 92/161; 92/163; 403/37; 403/337
[58] Field of Search ............. 91/275; 92/136, 138, 92/161, 163; 403/37, 337

[56] References Cited

U.S. PATENT DOCUMENTS

| | | | |
|---|---|---|---|
| 2,321,267 | 6/1943 | Van Der Werff | 92/138 X |
| 2,853,226 | 9/1958 | Maniscallo | 92/138 X |
| 2,876,747 | 3/1959 | Dermond | 92/138 X |
| 2,963,260 | 12/1960 | Siravo | 92/136 X |
| 3,376,895 | 4/1968 | Pray | 92/138 X |
| 3,452,961 | 7/1969 | Forsman | 92/138 X |
| 4,170,169 | 10/1979 | Shafer | 92/138 X |
| 4,260,128 | 4/1981 | Tito | 92/138 X |

Primary Examiner—Robert E. Garrett
Assistant Examiner—W. Williamson
Attorney, Agent, or Firm—Jordan and Hamburg

[57] ABSTRACT

A rotary actuator for converting a linear reciprocatory movement of a piston into a rotary reciprocatory movement of an output shaft through a connecting member. The rotary actuator includes a cylinder case formed with a pedestal in a position in which the output shaft extends vertically out of the cylinder case. The pedestal is formed with a substantially square elevated portion, and a depressed portion defined by the elevated portion. A plurality of projections spaced apart from each other by a predetermined angle are formed integrally with the pedestal in the depressed portion to constitute dividing lines of a scale for indicating the angle of rotation of the output shaft by means of a pointer.

6 Claims, 8 Drawing Sheets

ROTARY ACTUATOR

This application is a continuation of application Ser. No. 841,394, filed Mar. 19, 1986, now abandoned.

BACKGROUND OF THE INVENTION

This invention relates to rotary actuators for producing an output power by converting the reciprocatory linear movement of a piston caused by a fluid pressure into the reciprocatory rotary movement of an output shaft, and more particularly it is concerned with an actuator of the type described that can be utilized as an oscillating actuator for automatically opening and closing various types of valves and for operating a 90° rotary mechanism.

Rotary actuators of the aforesaid type are known.

In one type of rotary actuator of the prior art, a cylinder section formed at opposite ends with a fluid inlet port and a fluid outlet port and formed for containing a reciprocatory piston therein, and an output shaft section containing an output shaft coupled to the piston for rotation are constructed as a unitary structure. An electromagnetic valve for operation and a pressure reducing valve, etc., are connected through pipes to the inlet and outlet ports of the cylinder section to operate the rotary actuator.

In this type of rotary actuator of the prior art, it has hitherto been necessary to separately support an instrument or machine which is connected to an output shaft in the output shaft section. Because of this, when a positioner is assembled with the rotary actuator for controlling the position to which the output shaft of the rotary actuator rotates or when a switch actuated by the rotation of the output shaft of the rotary actuator, such as a limit switch, is assembled with the rotary actuator, it has hitherto been necessary to provide means for stationarily retaining a casing for the positioner or limit switch separately from the rotary actuator. Thus, the problems encountered in this type of rotary actuator of the prior art are that an additional space is required for the retaining means, that it costs an additional workforce for mounting the retaining means and that costs are increased as a result.

SUMMARY OF THE INVENTION

This invention has been developed for the purpose of obviating the aforesaid problems encountered in the prior art. Accordingly, the invention has as its object the provision of a rotary actuator capable of directly securing an instrument or machine thereto which is coupled to the output shaft.

The aforesaid object is accomplished according to the invention by the following features: a pedestal is located in, and projects outwardly from, a portion of a main body of the rotary actuator for supporting the output shaft and formed with a substantially square elevated portion for bolting thereto a positioner or switch which is positioned against the rotary actuator; and the elevated portion defines a depressed portion having formed integrally therewith a plurality of projections, constituting dividing lines of a scale, which are spaced apart from each other by a predetermined angle and located symmetrically on the right and left sides of the main body with respect to a plane including the center axis of the output shaft and perpendicular to the axis of a cylinder case.

In the rotary actuator according to the invention which has the aforesaid features, a casing of the machine or instrument can be secured to the pedestal either directly or through the agency of a bracket and a rotary shaft of the machine or instrument can be coupled to the output shaft of the rotary actuator by a male-and-female interfitting or by means of a simple coupling, to enable a positioner, for example, to be handled as a unitary structure with the main body of the rotary actuator. By this arrangement, the rotation of the output shaft of the rotary actuator can be transmitted to the rotary shaft of the machine or instrument, to thereby take out an electric signal or a fluid signal to control the rotary actuator itself or other machine or instrument.

The invention provides a rotary actuator which permits a positioner or switch to be assembled therewith compactly in a unitary structure. The invention eliminates the need to provide an additional space for mounting means for retaining a positioner or switch.

The dividing lines of the scale provided on the pedestal is formed integrally with the pedestal, so that the risk that errors might be made in mounting the scale in rotary actuator of the prior art can be eliminated and the angle of rotation of the output shaft can be indicated accurately.

DETAILED DESCRIPTION OF THE PREFERRED EMBODIMENTS

Preferred embodiments of the invention will now be described by referring to the drawings.

Referring to FIGS. 1-5, a rotary actuator generally designated by the numeral 1 comprises a cylinder section including a piston 2 and a cylinder case 3 for mounting the piston 2 for slidable reciprocatory movement, and an output shaft section 9 including an output shaft 8 supported for rotation by a first support portion 4 and a second support portion 5 formed integrally with the cylinder case 3 through metal members 6 and 7.

The piston 2 includes two piston members 2a and 2b and a bridge 2c interconnecting the two piston members 2a and 2b. The bridge 2c includes two ribs spaced apart from each other across the center axis of the piston 2 (vertically spaced apart in FIG. 3) and extending parallel thereto (see FIGS. 3 and 4). The two parallel ribs are located in a zone occupying substantially one half the area of a cylindrical space between the piston members 2a and 2b so as to be eccentrically disposed in one lateral portion of the interior of the cylinder case 3 with respect to the piston 2. By this arrangement, the bridge 2c is disposed in a position which allows the output shaft 8 to be supported in a position spaced apart from the center axis of the piston 2 in the cylinder case 3, to prevent the bridge 2c from abutting against the output shaft 8 when the piston members 2a and 2b move in reciprocatory movement. A pin 11 secured at opposite ends to the two parallel ribs constituting the bridge 2c extends parallel to the output shaft 8.

A connecting arm 10 is secured at one end thereof to the output shaft 8 and extends at an opposite end thereof toward a space defined between the two ribs constituting the bridge 2c. The connecting arm 10, which is in the form of an elongated thick bar of a thickness small enough to extend through the space between the two parallel ribs constituting the bridge 2c, is formed at one end portion thereof with an opening 10a for the output shaft 8 to extend therethrough and has at an opposite end portion thereof a bifurcated portion 10b extending substantially parallel to a plane perpendicular to the center axis of the output shaft 8. The bifurcated portion 10b is constructed such that two fingers of the bifurcated portion 10b are spaced apart from each other a distance corresponding to the outer diameter of the pin 11 or a ring 12 fitted to the pin 11 to facilitate the sliding movement of the bifurcated portion 10b. The connecting arm 10 may be formed of powder metal by sintering as a unitary structure.

When the connecting arm 10 is formed of sintered metal, it is possible to form the bifurcated portion 10b of complex construction with a tolerance of less than 1/100 mm in the spacing between the two fingers of the bifurcated portion 10b, and no precise machining is required. Thus, there is almost no play between the pin 11 or ring 12 of the piston 2 and the fingers of the bifurcated portion 10b of the connecting arm 10. The pin 11 or ring 12 are cylindrical in shape, so that precise finishes can be imparted thereto by machining.

The bifurcated portion 10b of the connecting arm 10 extends through the space defined by the two ribs constituting the bridge 2c. This enables the bifurcated portion 10b of the connecting arm 10 to be elongated as much as possible so long as the bifurcated portion 10b is prevented from abutting against the cylinder case 3 when the output shaft 8 rotates. Also, the position in which the pin 11 contacts the two fingers of the bifurcated portion 10b is preferably located near the cylinder case 3 to increase the distance between the center axis of the output shaft 8 and the center axis of the pin 11. By this arrangement, a torque transmitted from the piston members 2a and 2b and the bridge 2c to the output shaft 8 can be increased, to enable an output torque of high magnitude to be obtained.

Seals 2d are each mounted between one of the piston sections 2a and 2b and the cylinder case 3 to provide a seal therebetween. The seals 2d may be in the form of O-rings. However, if lip packings are arranged as shown so that air can leak outside from between the two piston sections 2a and 2b but prevented from entering the space defined between the two piston sections 2a and 2b, the problem is presented which might face the O-rings that a rise in the pressure of air in the space between the two piston members 2a and 2b would increase the sliding resistance offered to the seals. The lip packings may be of any one of the U-type, Y-type and V-type.

The output shaft 8 is prevented from being dislodged from the support portions 4 and 5 by stop rings 13 and 14.

The cylinder case 3 is closed at opposite ends by flanges 15 and 16. An adjusting screw 17 is threadably inserted in each one of the flanges 15 and 16 and abuts against the piston section 2a and 2b to regulate the limit of a movement of the piston 2. Each adjusting screw 17 can be secured in position by a nut 18.

The cylinder case 3, first and second support portions 4 and 5 and flanges 15 and 16 constitute a main body of the rotary actuator 1. The second support portion 5 is formed with a pedestal 5a projecting outwardly from the cylinder case 3 and formed with a substantially square elevated portion defining a depressed portion 5b. A plurality of projections spaced apart from each other by a predetermined angle, which constitute dividing lines 20 of a scale for indicating the angle of rotation of the output shaft 8 by a pointer 19 attached to the output shaft 8, are formed integrally with the pedestal 5a in the depressed portion 5b. The projections constituting the dividing lines 20 of the scale preferably have a height which is equal to or smaller than that of the elevated portion of the pedestal 5a.

Figure 1:
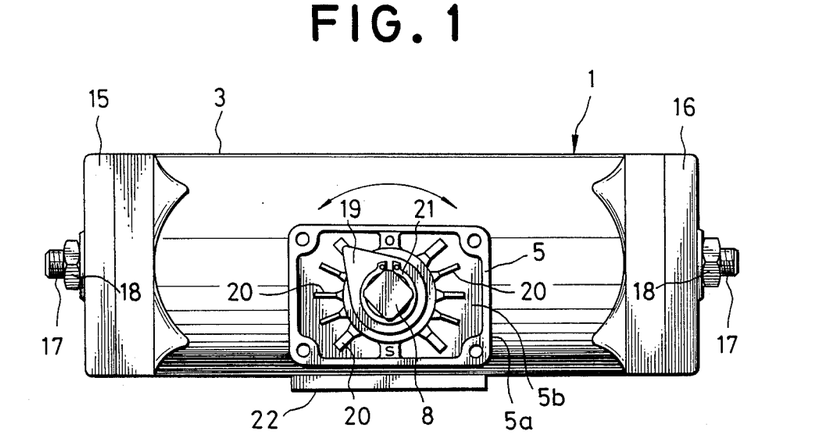
FIG. 1 is a plan view of a rotary actuator comprising one embodiment of the invention.

The pointer 19 is formed with a square opening in which a connecting end portion 8a of the output shaft 8, square in cross section, is inserted and fixed in place by a stop ring 21. Generally, the output shaft 8 rotates through 90 degrees to open and close a valve or a switch connected to the output shaft 8. When pointing to those projections constituting the dividing lines 20 of the scale which are located on the right side of a plane perpendicular to the center axis of the cylinder case 3, the pointer 19 can perform an operation distinct from the operation performed when the projections located on the left side of such plane are indicated. For example, when the output shaft 8 is to be switched from a closing position to an opening position by rotating clockwise while the pointer 19 points to the projections constituting the dividing lines 20 of the scale located on the right side, the output shaft 8 is switched from the opening position to the closing position by rotating counterclockwise. If the pointer 19 is rearranged to point to the dividing lines 20 of the scale located on the left side, the dividing lines of the scale 20 can be used such that output shaft 8 is switched from the opening to the closing position by rotating clockwise and from the closing position to the opening position by rotating counterclockwise. To this end, marks indicating "open" and "close" had better be put at diametrically opposed positions in a plane perpendicular to the center axis of the cylinder case 3. In FIG. 1, marks "O" and "S" are shown in indicating "open" and "close", respectively. Thus, the invention offers the advantage that, merely by switching the arrangement of the pointer 19 in accordance with the direction in which a member connected to the output shaft 8 is opened or closed, the rotary actuator can be made to meet the requirements of the machine or instrument connected to the output shaft 8.

Figure 5:
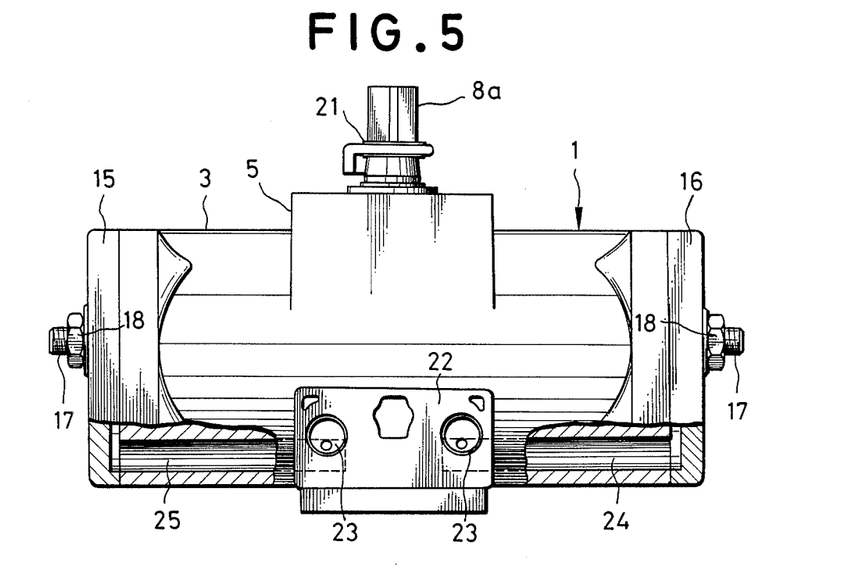
FIG. 5 is a front view, with certain parts being broken away, of the rotary actuator shown in FIG. 1.

The cylinder case 3 is formed at one side with a mount 22 for supporting an electromagnetic valve, for example. The mount 22 is formed therein with a pair of openings 23 as shown in FIG. 5, which are maintained, via channels 24 and 25 formed in the cylinder case 3, in communication with chambers defined between the piston section 2b and flange 16 and between the piston section 2a and flange 15, respectively.

Figure 6:
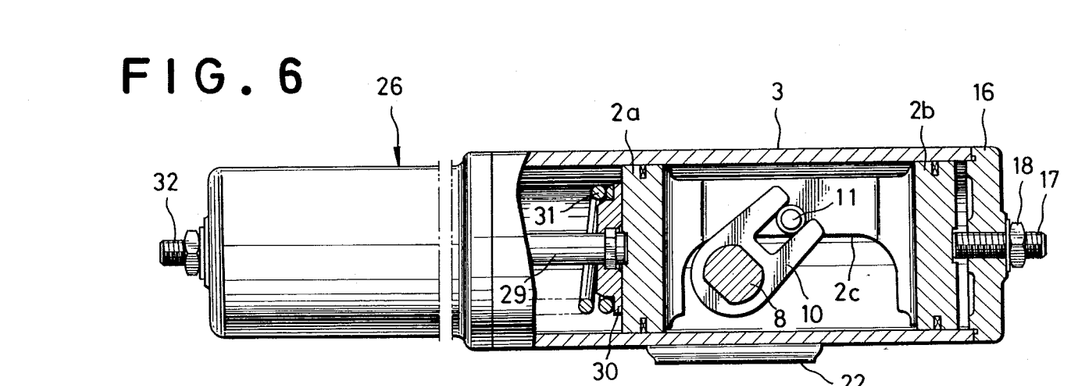
FIG. 6 is a plan view, with certain parts being broken away, of a single-acting rotary actuator comprising another embodiment of the invention.
Figure 7:
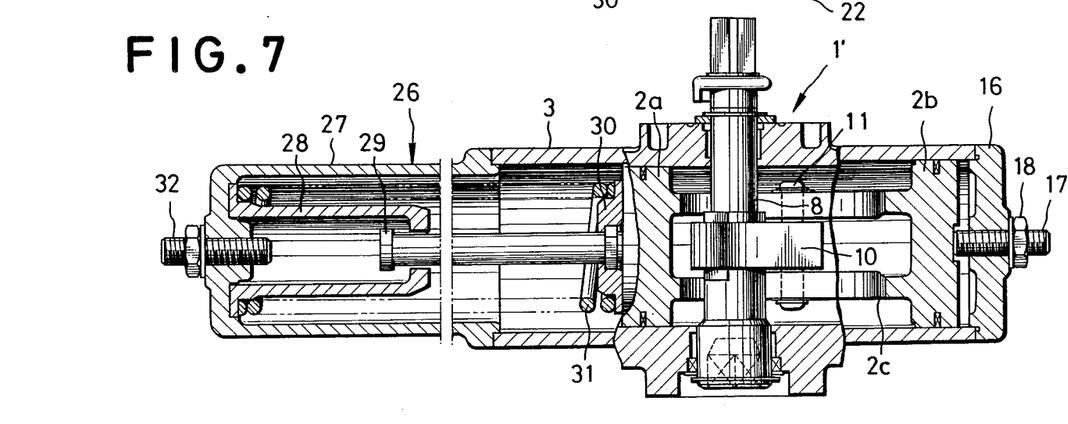
FIG. 7 is a front view, as seen in vertical cross section, of the rotary actuator shown in FIG. 6.

The rotary actuator 1 shown in FIGS. 1–5 is a double-acting type rotary actuator which operates such that the channels 24 and 25 are alternately switched to the suction side and discharge side by the action of the electromagnetic valve. A modification of this rotary actuator is shown in FIGS. 6 and 7 which has a spring cartridge 26 secured to one end of the cylinder case 3 in place of the flange 15, for example, to provide a single-acting rotary actuator 1'.

The spring cartridge 26 comprises a cartridge case 27, a sleeve-like spring retainer 28 supported in the cartridge case 27, a spring guide 29 slidably supported by the spring retainer 28, a spring support disc 30 secured to the spring guide 29 and a spring 31 mounted between the spring retainer 28 and the spring support disc 30. When the spring cartridge 26 is secured to the cylinder case 3, the spring support disc 30 is forced against the piston 2 (the piston section 2a as shown in FIG. 6).

As a fluid is supplied to the rotary actuator 1' by the action of the electromagnetic valve latched on to the mount 22, the piston is urged to move leftwardly in the figure against the biasing force of the spring 31. The distance covered by the movement of the piston 2 can be adjusted by an adjusting screw 32 threadably inserted in the cartridge case 27.

As the fluid is discharged from the rotary actuator 1' by switching the electomagnetic valve, the piston 2 is restored to the original position by the biasing force of the spring 31.

In the rotary actuators 1, 1' of the aforesaid construction, known seals are provided to portions necessary to prevent leaks of fluid, although not shown.

A positioner for controlling the position to which the output shaft 8 of the rotary actuator is rotated or a switch, such as a rotary switch, for taking out an electric signal when the output shaft 8 rotates may be connected to the output shaft 8 of the rotary actuator 1, 1'. The positioner or rotary switch can be directly threadably fitted in internally threaded openings in the pedestal 5a. When this is the case, the shaft of the positioner or rotary valve may be connected to the output shaft 8 through a coupling or by inserting the end portion of the output shaft 8 of square cross-sectional shape in a square hole formed at an end portion of the shaft of the positioner or rotary valve. Thus, the positioner or rotary valve can be assembled with the rotary actuator in a unitary structure.

Figure 8:
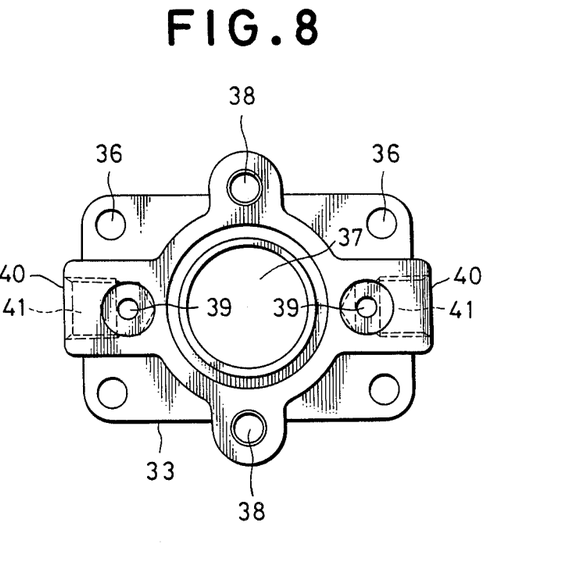
FIG. 8 is a plan view of the bracket that can be attached to the rotary actuator for supporting a positioner or switch.
Figure 9:
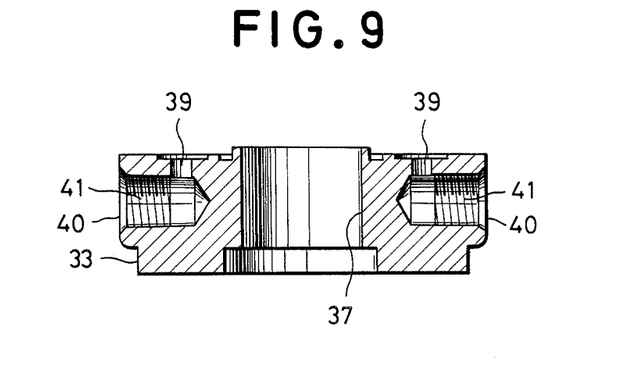
FIG. 9 is a front view, as seen in cross section, of the bracket shown in FIG. 8.
Figure 10:
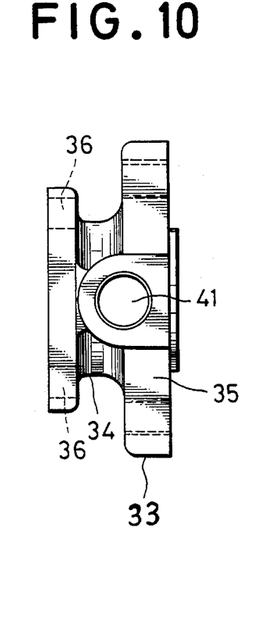
FIG. 10 is a left side view of the bracket shown in FIG. 8.

In place of directly mounting a positioner or rotary switch to the pedestal 5a, a bracket 33 may be used for assembling a positioner or rotary valve with the rotary actuator. As shown in FIGS. 8–10, the bracket 33 comprises a base 34 positioned against the pedestal 5a, and a seat 35 formed integrally with the base 34. Internally threaded openings 36 are formed at the base 34 for threadably, inserting screws in the internally threaded openings at the pedestal 5a to connect the bracket 33 to the rotary actuator 1, 1'. A through hole 37 is formed at the seat 35 of the base 34 and has a size such that the output shaft 8 of the rotary actuator, the shaft of the positioner or rotary valve to be connected to the output shaft 8 and a coupling that may be used for connecting the output shaft 8 to the shaft of the positioner or rotary valve can be inserted and rotated therein.

The seat 35 is formed with internally threaded openings 38 for securing the casing of the positioner or rotary switch. Ports 39 are formed at the seat 35 in a position corresponding to the channels or the positioner or rotary switch for supplying a fluid thereto. Channels 41 having connecting ports 40 connected to a fluid source and the like through conduits are formed at the sides of the base 34 and/or the seat 35 for communication with the ports 39. In FIG. 8, the seat 35 is substantially in crisscross form and only has portion necessary for forming the internally threaded openings 38 and ports 39 and attaching a positioner or rotary valve thereto. However, the invention is not limited to this specific form of the bracket 33.

Figure 11:
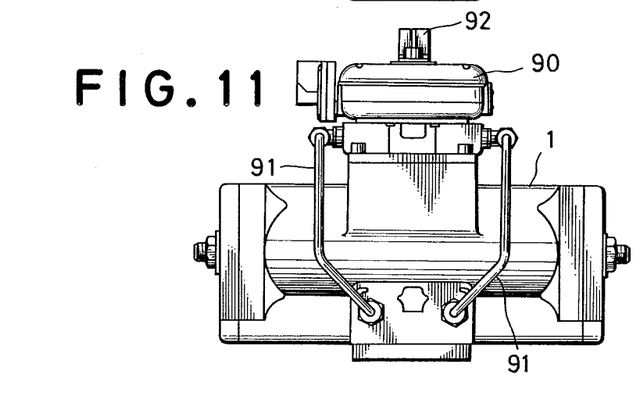
FIG. 11 is a front view of the rotary actuator having a positioner supported by the bracket shown in FIG. 8.
Figure 12:
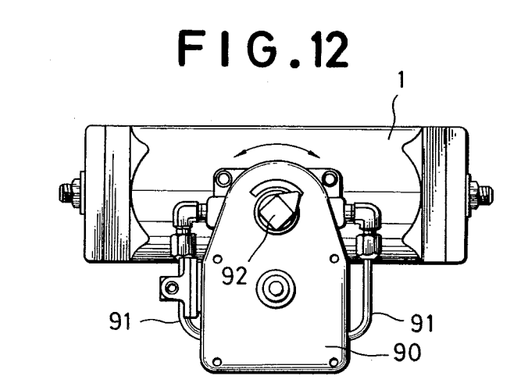
FIG. 12 is a plan view of the rotary actuator with the positioner shown in FIG. 11.
Figure 13:
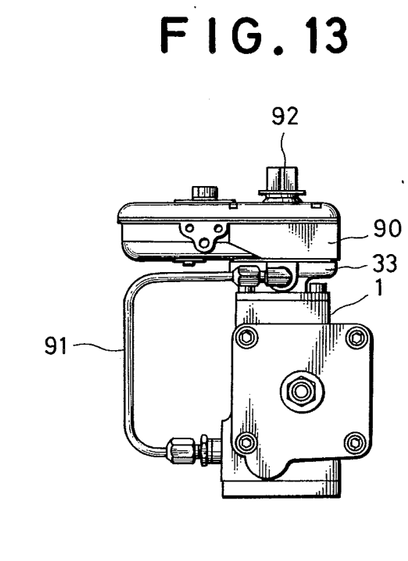
FIG. 13 is a right side view of the rotary actuator with the positioner shown in FIG. 11.

FIGS. 11 and 12 show an example of the rotary actuator having a positioner attached thereto by using the bracket 33 to provide a unitary structure. As shown, the rotary actuator 1 has secured thereto the bracket 33 to which a positioner 90 is attached. The cylinder section of the rotary actuator 1 is connected to the positioner 90 via conduits 91 constituting channels. The positioner 90 has an output shaft 92 connected to another machine or instrument.

Figures 14, 15, 16:
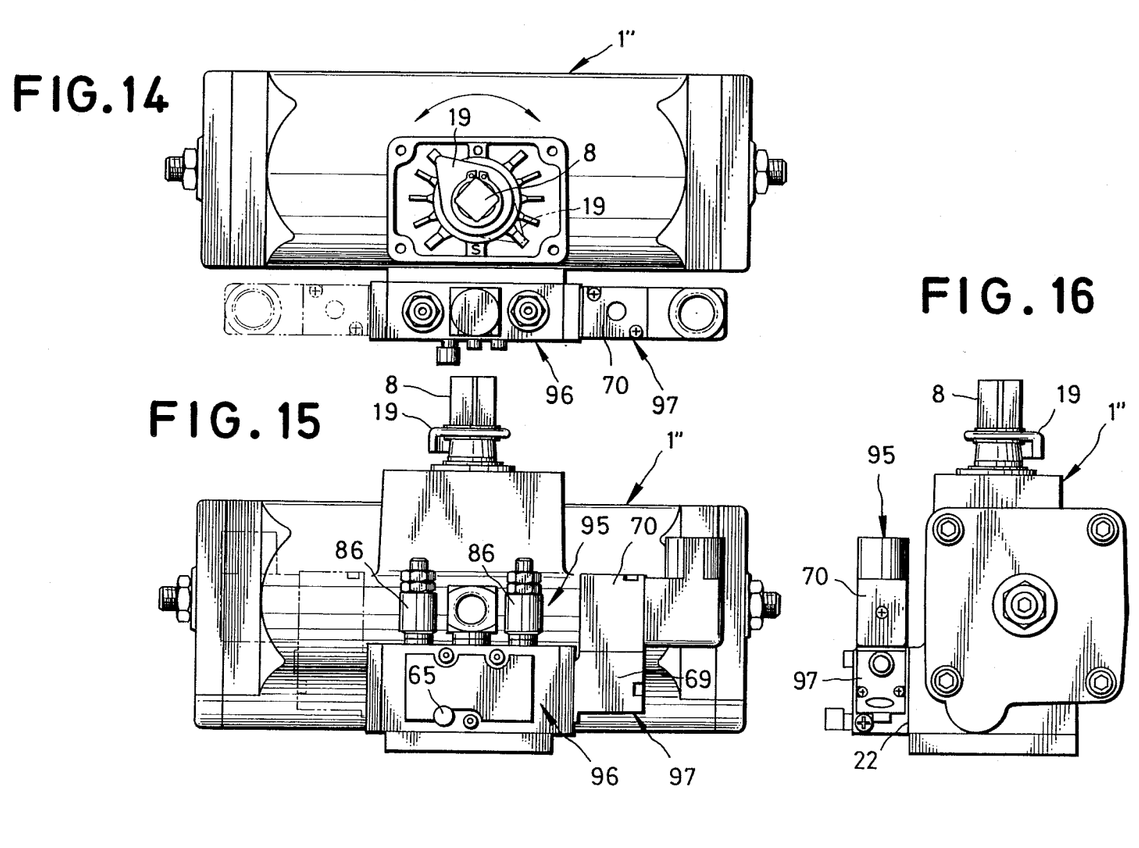
FIG. 14 is a plan view of a rotary actuator having secured thereto an electromagnetic valve provided with a speed controller as one example of operating means.
FIG. 15 is a front view of the rotary actuator shown in FIG. 14.
FIG. 16 is a right side view of the rotary actuator shown in FIG. 15.

FIGS. 14–16 show an example of the rotary actuator 1, 1" having an operating valve with no pipes provided so that the actuator and operating valve forms a unitary structure by directly attaching an electromagnetic valve to the mount 22. One constructional form of electromagnetic valve used with the rotary actuator 1, 1" as shown in FIGS. 14–16 is shown in FIGS. 17 and 18.

Figure 17:
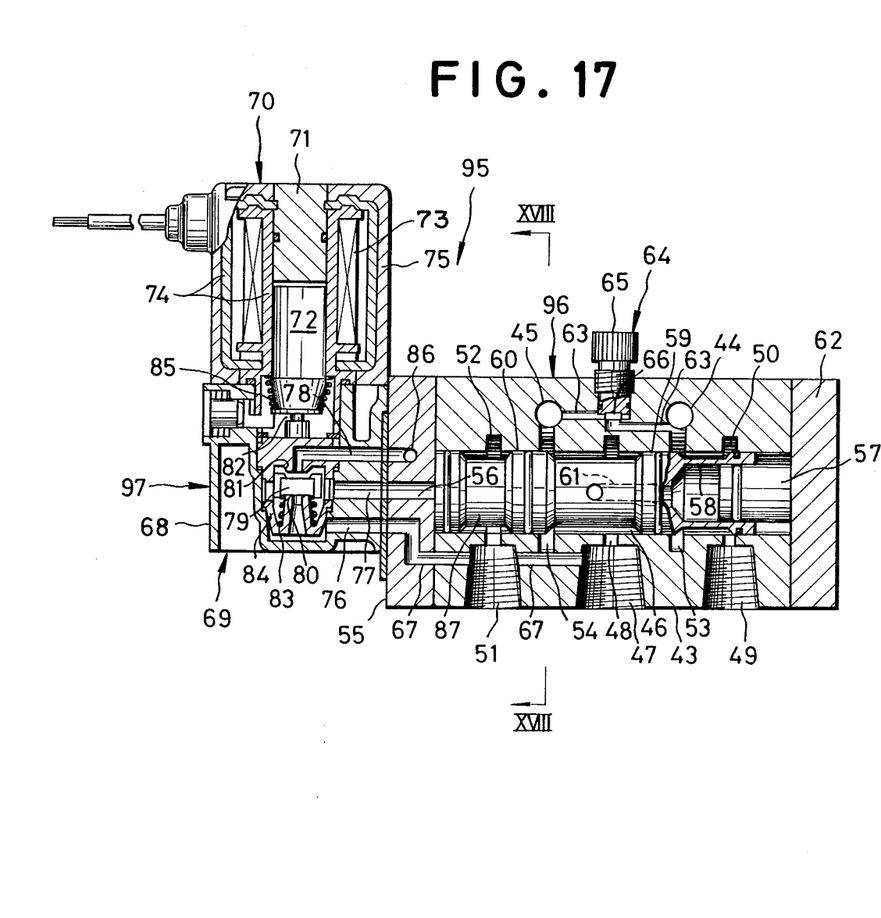
FIG. 17 is a front view, as seen in vertical cross section, of an electromagnetic valve shown as one example of operating means.
Figure 18:
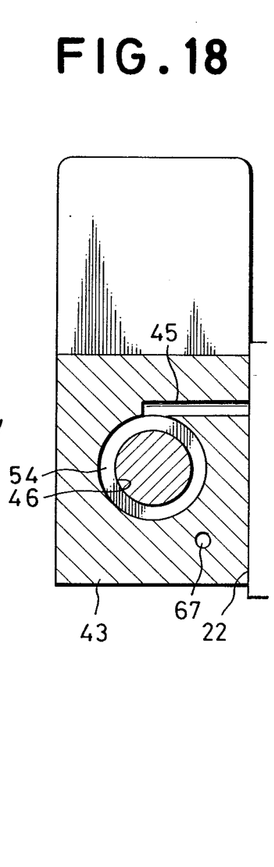
FIG. 18 is a sectional view taken along the line XVIII—XVIII in FIG. 17.

As shown in FIGS. 17 and 18, the electromagnetic valve 95 includes a main valve 96 and a pilot valve 97. The main valve 96 has a main valve body 43 positioned against the mount 22 and bolted thereto. The main valve body 43 is formed at a surface positioned against the mount 22 with a first output port 44 and a second output port 45 located in positions in which they communicate with respective ports 23 formed at the mount 22. The main valve body 43 is formed with a center axial bore 46 for receiving a spool 87 for reciprocatory sliding movement. The bore 46 is formed, in suitable positions, with a third annular groove 48 communicating with a fluid supply port 47, a first annular groove 50 communicating with a first fluid discharge port 49, a fifth annular groove 52 communicating with a second fluid discharge port 51, a second annular groove 53 communicating with the first output port 44 and a fourth annular groove 54 communicating with the second output port 45. An end cover 55 of the valve body 43 located at the left end in FIG. 17 is formed with a pilot actuation fluid passage 56 to apply a fluid pressure to one end (left end in FIG. 17) of the spool 87.

The spool 87 is formed, at an end portion thereof opposite an end adjacent the pilot actuation fluid passage 56, with a cylindrical bore 58 for receiving a spool piston 57 for sliding movement. The cylindrical bore 58 is maintained in communication with a fluid passage 61 formed in the spool 87 and opening at the outer periphery of the spool 87 between lands 59 and 60 of the spool 87, the third annular groove 48 being located therebetween. The spool piston 57 is positioned against an end cover 62 for sealing an end of the main valve body 43 opposite the end cover 55 through which the pilot actuation fluid passage 56 extends.

The first output port 44 is communicated with the second output port 45 by a bypass 63 mounting a bypass valve 64 for opening and closing the bypass 63. The bypass valve 64 has a knob 65 projecting out of the main valve body 43, so that a valve 66 can be brought into and out of engagement with a valve seat located in the bypass 63. Although the knob 65 is shown as projecting upwardly in FIG. 17, this is not restrictive and the knob 65 may project in any other direction that is convenient for operation.

Maintained in communication with the fluid supply port 47 is a pilot fluid supply passage 67 extending through the main valve body 43 and opening at the end of the end cover 55.

A casing 68 of the pilot valve 97 is secured as by screwing to the cover 55 of the main valve 96.

The pilot valve 97 includes a valve section 69 and a solenoid section 70. The solenoid section 70 which is known includes a fixed iron core 71, a movable iron core 72 located coaxially with the fixed iron core 71 for axial movement, a coil 73 secured to enclose the fixed iron core 71 and movable iron core 72 and a yoke 74. The solenoid section 70 of this construction is contained in a casing 75.

The valve section 69 includes a casing 68 formed with a fluid supply passage 76, a pilot fluid passage 77 and a fluid discharge passage 78, and a valve body 79 adapted to come into engagement with a first valve seat 80 located at the junction of the fluid supply passage 76 and pilot fluid passage 77. The valve body 79 can also be brought into engagement with a second valve seat 81 located at the junction of the fluid discharge passage 78 and pilot fluid passage 77. A rod 82 connected to the valve body 79 serves as a valve stem and is positioned against the movable iron core 72 of the solenoid section 70 by the biasing force of a spring 83.

When the coil 73 is energized and the movable iron core 72 is attracted to the fixed iron core 71, the valve body 79 is moved by the biasing force of the spring 83 from the first valve seat 80 to the second valve seat 81 to close same. This allows compressed air fed through the fluid supply port 47 to be supplied to the center axis bore 46 of the main valve body 43 via the fluid supply passage 76 and pilot fluid passage 77. This moves the spool 87, to which compressed air acts at its left end as seen in FIG. 17, and the cylindrical bore 58, rightwardly toward the spool piston 57 by virtue of the difference in area. In a normal condition in which the pilot actuation fluid passage 56 is closed, the spool 87 is kept in the left position by the compressed air acting in the cylindrical bore 58. In the normal condition, the compressed air is fed from the fluid supply port 47 to the second output port 45, from which it flows through the opening 23 and channel 25 to the cylinder case 3, to keep the piston 2 in the condition shown in FIG. 2.

As the solenoid section 70 is energized, the valve body 79 of the valve section 69 switches fluid passage and causes compressed air to flow to the pilot actuation fluid passage 56. This moves the spool 87 rightwardly in FIG. 17 to bring the third annular groove 48 into communication with the second annular groove 53, to bring the fluid supply port 47 into communication with the first output port 44. At this time, the flow of fluid between the third annular groove 48 and fourth annular groove 54 is blocked and the fourth annular groove 48 is communicated with the fifth annular 52, so that the second output port 45 is communicated with the second discharge port 51 and the compressed air acting on the piston section 2a of the rotary compressor is discharged. Thus, as the compressed air is supplied through the first output port 44, opening 23 and channel 24, the piston 2 of the rotary actuator moves leftwardly in FIG. 17 and the output shaft 8 rotates counterclockwise in FIG. 1.

The valve section 69 of the pilot valve 97 has been shown and described as having a single valve body for the first valve seat 80 and second valve seat 81. However, the invention is not limited to a single valve body, and separate valve bodies for the first and second valve seats 80 and 81 may be provided. The valve seats 80 and 81 and valve body 79 are contained in a frame 84. However, this is not restrictive, and the frame 84 may be formed integrally with the casing 68.

As the coil 73 of the solenoid section 70 is de-energized, the movable iron core 72 is urged to move away from the fixed iron core 71 by the biasing force of the spring 85, to thereby open the first valve seat 80 and close the second valve seat 81. This causes the compressed air acting on the spool 87 through the pilot actuation fluid passage 56 to be discharged through the fluid discharge passage 78. In FIG. 17, the fluid is shown as being discharged from the fluid discharge passage 78 through a discharge port 86 formed in the end cover 55. At this time, the spool 87 is restored to its original position on the left side as shown by the action of the compressed air normally acting in the cylindrical bore 58 of the spool 87 and held in such position.

When the spool 87 is in this position, compressed air is fed from the fluid supply port 47 to the chamber between the piston section 2a and flange 15 in the cylinder case 3 via the second output port 45, opening 23 and channel 25, and at the same time the compressed air acting in the chamber between the piston section 2b and flange 16 in the cylinder case 3 is discharged from the first discharge port 49 via the channel 24, opening 23, first output port 44 and a gap connecting the first annular groove 50 with the second annular groove 53. This moves the piston 2 rightwardly to the position shown in FIG. 2.

When power supply is cut off, one may desire to manually operate the output shaft 8 of the rotary actuator 1. In this case, if pneumatic pressure acts only in one of the chambers between the piston section 2a and flange 15 and between the piston section 2b and flange 16, then it is impossible to rotate the output shaft 8 readily. To avoid this trouble, the knob 65 if the bypass valve 64 may be turned to open the bypass 63 to bring the first output port 44 into communication with the second output port 45. This restores balance to the forces acting in the chambers between the piston section 2a and flange 15 and between the piston section 2b and flange 16 in the cylinder case 3, thereby permitting the output shaft 8 to be manually rotated with ease.

The invention is not limited to the specific form of pilot valve 97 shown in FIGS. 17 and 18, and a valve of any construction may be used so long as it is a two-position three-way valve that can be secured to the main valve 96.

Speed controllers 86 may be connected to the first fluid discharge port 49 and second fluid discharge port 51 of the main valve 96 of the electromagnetic valve 95 as shown in FIG. 15.

Figure 2:
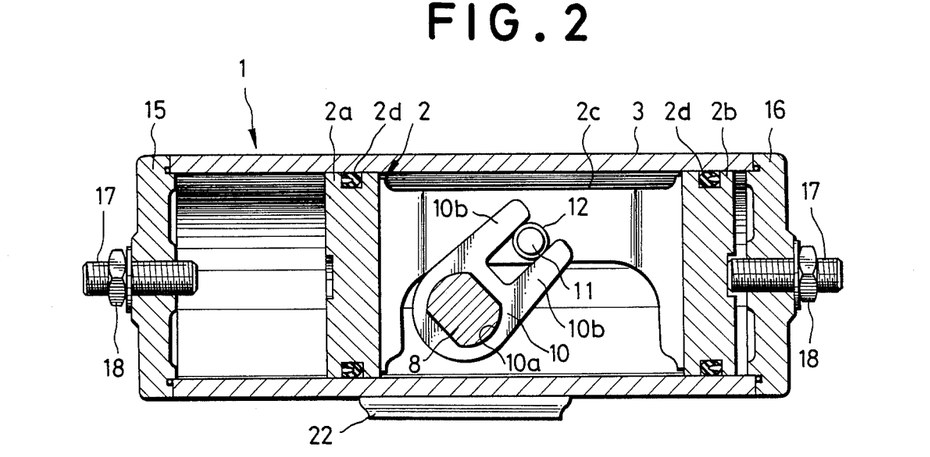
FIG. 2 is a plan view of the rotary actuator shown in FIG. 1, as seen in transverse cross section.
Figure 3:
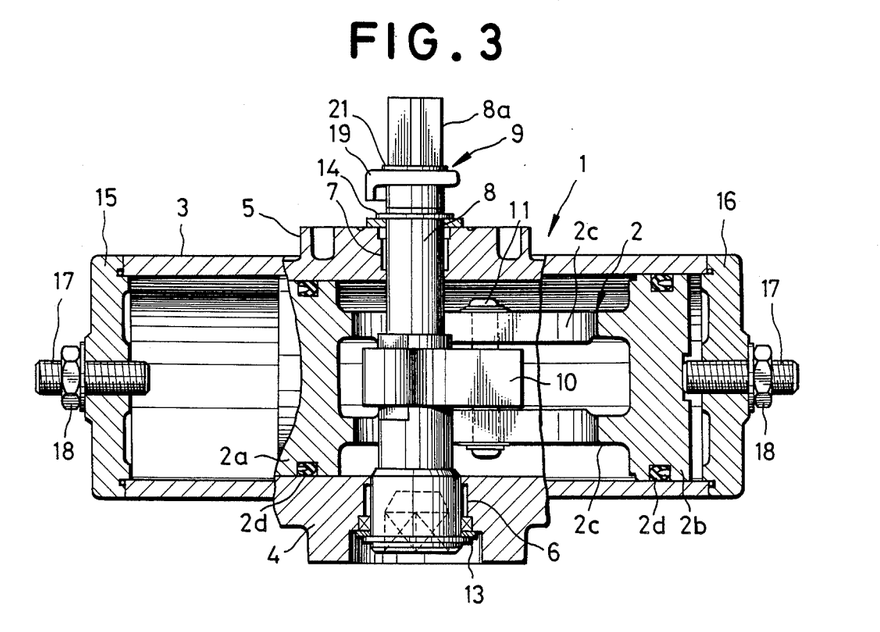
FIG. 3 is a front view of the rotary actuator shown in FIG. 1, as seen in vertical cross section.
Figure 4:
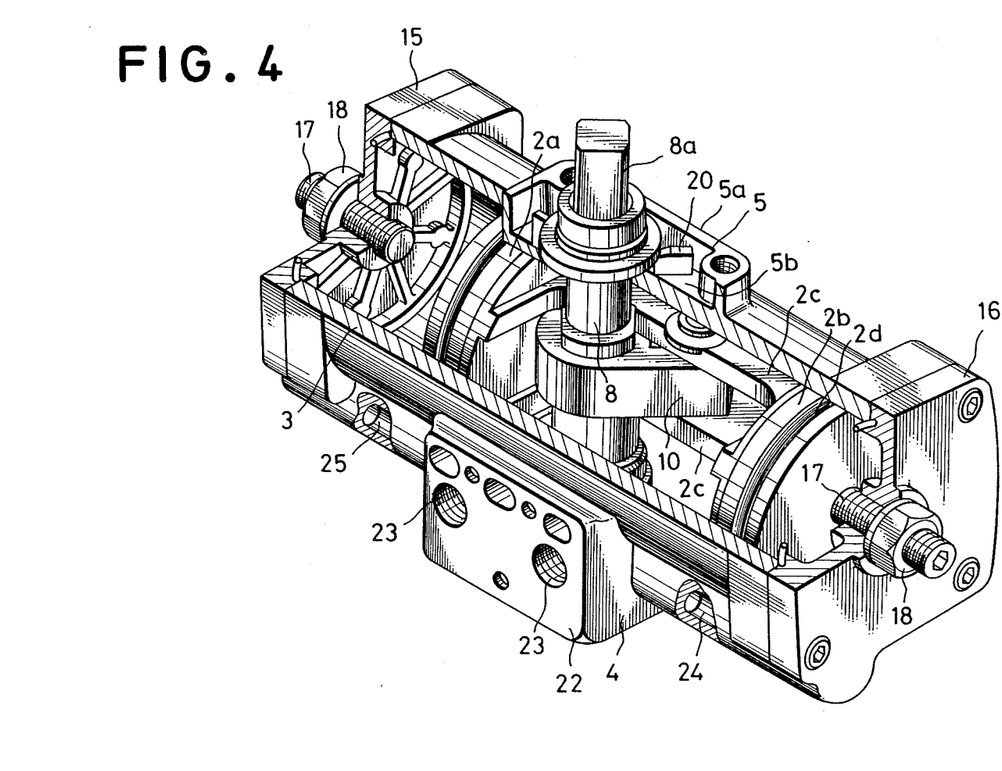
FIG. 4 is a perspective view, with certain parts being broken away, of the rotary shown in FIG. 1.

When the pointer 19 is in the position shown in FIG. 14, a valve connected to the output shaft 8 is in an open (O) position if the piston 2 is in the normal position shown in FIG. 2. The solenoid section 70 of the pilot valve 97 is energized and the output shaft 8 rotates counterclockwise (indicated as rotating leftwardly in FIG. 14) to switch the valve to a closed (S) position.

When the valve connected to the output shaft 8 is of the type which is normally in the closed (S) position and switched to the open position (O) as the solenoid section 70 of the pilot valve 97 is energized, the valve is formed at the mount 22 with the chambers defined by the piston members 2a, 2b and the flanges 15, 16 are formed in the main body. This makes it possible to produce a rotary actuator of good external appearance on a mass production basis.

In the rotary actuator according to the invention, an electromagnetic valve for operating the actuator can be supported by the mount. This makes it possible to obtain a rotary actuator provided with an operating machine but having no pipes connected thereto.

By rotating the adjusting screws at opposite ends of the rotary actuator according to the invention, it is possible to adjust the distance covered by the movement of each of the piston sections of the piston.

By merely performing the simple operation of rearranging the pointer, it is possible for the rotary actuator to handle different types of valves for which the output shaft should be rotated in opposite directions to switch them from an open position to a closed position.

What is claimed is:

1. A rotary actuator comprising
   a piston;
   a cylinder case having a center axis for containing said piston for reciprocatory sliding movement;
   an output shaft having a center axis rotatably supported by said cylinder case and extending in a direction perpendicular to the center axis of the cylinder case; and
   a connecting member connecting said piston to said output shaft for converting a reciprocatory linear movement of the piston into a reciprocatory rotary movement of the output shaft;
   wherein the improvement comprises:
   a pedestal extending outwardly from support portions of the cylinder case for supporting the output shaft at a free end thereof, said pedestal being formed with a substantially square elevated portion defining a depressed portion, and a plurality of projections constituting dividing lines of a scale which are formed integrally with the pedestal at the depressed portion, said projections being spaced apart from each other by a predetermined angle and located symmetrically on the left and right with respect to a plane extending through the center axis of the output shaft and perpendicular to the center axis of the cylinder case, a pointer being attached to the output shaft and an attaching position of said pointer relative to said output shaft being able to be changed by a predetermined angle.

2. A rotary actuator as claimed in claim 1, wherein said connecting member is formed of sintered metal.

3. A rotary actuator comprising:
   a piston;
   a cylinder case having a center axis for containing said piston for reciprocatory sliding movement;
   an output shaft rotatably supported by said cylinder case and extending in a direction perpendicular to the center axis of the cylinder case; and
   a connecting member connecting said piston to said output shaft for converting a reciprocatory linear movement of the piston into a reciprocatory rotary movement of the output shaft;
   wherein the improvement comprises:
   a pedestal extending outwardly from support portions of the cylinder case for supporting the output shaft at a free end thereof, said pedestal having a bracket detachably attached thereto by bolts, said bracket including a base for securing the bracket to the pedestal, and a seat formed integrally with the base, said base and seat being formed with a bore extending therethrough for receiving said output shaft, said seat being formed with internally threaded openings for threadably receiving a machine or instrument attached to the seat, and ports located in positions suitable for supplying a working fluid to the machine or instrument, said ports being connected with channels having connecting ports at the sides of said base.

4. A rotary actuator comprising:
   a piston:
   a cylinder case having a center axis for containing said portion for reciprocatory sliding movement;
   an output shaft having a center axis rotatably supported by said cylinder case and extending in a direction perpendicular to the center axis of the cylinder case;
   a connecting member connecting said piston to said output shaft for converting reciprocatory linear movement of the piston into a reciprocatory rotary movement of the output shaft;
   wherein the improvement comprises:
   a mount formed at least at one side of the cylinder case integrally therewith;
   a plurality of openings formed in said mount and serving as suction and discharge ports respectively for a fluid; and
   a plurality of channels defined in a main body, each of said plurality of channels communicating one of said plurality of openings with one of a plurality of chambers formed at end portions of the cylinder case.

5. The rotary actuator of claim 4, wherein said cylinder case has cylinder ends, and further comprising stop means on at least one cylinder end for limiting the linear movement of said piston.

6. The rotary actuator of claim 3 wherein said stop means comprises an adjusting screw in at least one of said cylinder ends.

* * * * *